Jan. 1, 1929.  N. Y. TROIDL  1,696,987
EDUCATIONAL APPLIANCE
Filed May 21, 1926  2 Sheets-Sheet 1
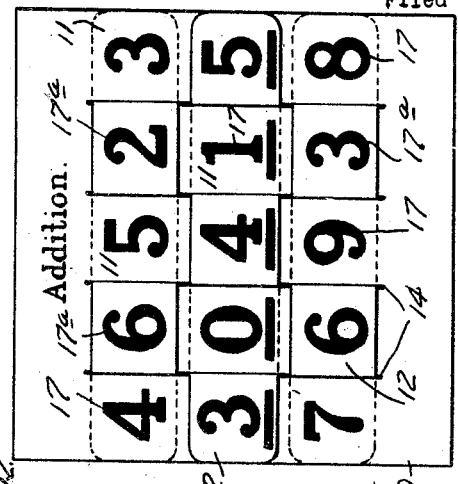
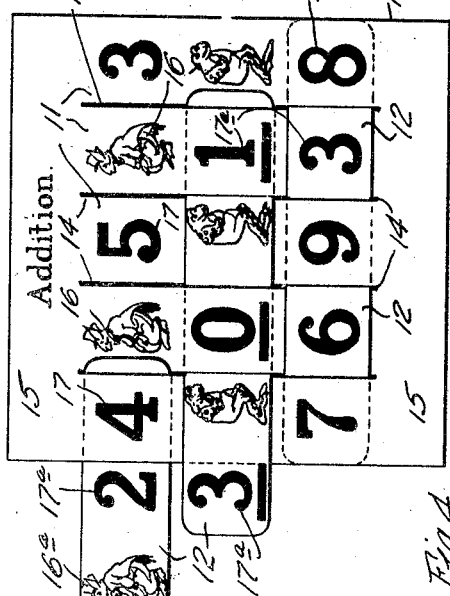
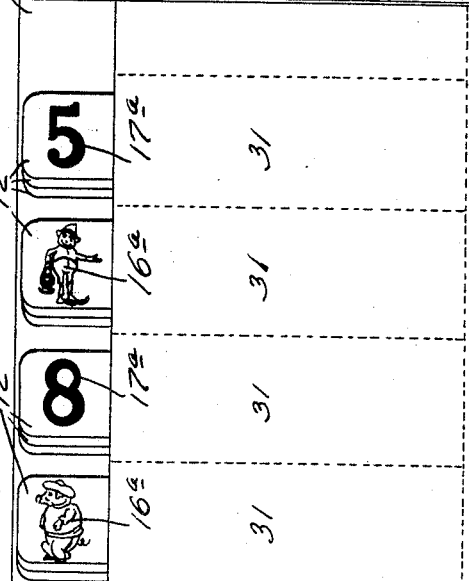
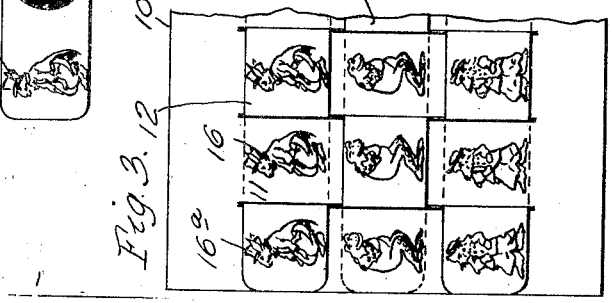
INVENTOR
Nellie York Troidl
by Parker & Prochnow
ATTORNEYS.

Jan. 1, 1929.

N. Y. TROIDL

EDUCATIONAL APPLIANCE

Filed May 21, 1926

| 12ª | is | Old |
| --- | --- | --- |
| | Come | hear |

| 10ª | Old Mother Goose. | | | | |
| --- | --- | --- | --- | --- | --- |
| | Here 11ª | 11ª | dear 11ª | 11ª | Mother 11ª |
| | Goose | | and | | her |
| | Merry 12ª | rhymes | She | will | tell |
| | you | about | little | BoPeep | and |

INVENTOR
Nellie York Troidl
by
Parker & Prochnow
ATTORNEYS.

Patented Jan. 1, 1929.

1,696,987

UNITED STATES PATENT OFFICE.

NELLIE YORK TROIDL, OF NIAGARA FALLS, NEW YORK.

EDUCATIONAL APPLIANCE.

Application filed May 21, 1926. Serial No. 110,665.

This invention relates to educational appliances, toys or devices for use in teaching or imparting knowledge to and entertaining young children, particularly in school work.

Certain objects of the invention are to provide an educational appliance or toy which is constructed and adapted to teach the elementary principles of weaving, that is, the interlacing of a plurality of strips or strands of material to produce a mat or woven piece and the component strips of which bear correlated matter such that, in addition to teaching weaving, the device is also adapted to enable a child, or other person, to associate or combine a plurality of strips in a particular order, and by such association, is also of use for self-teaching elementary work, such, for example, as simple spelling, arithmetic and primary reading and language through methods of self-verification.

Other objects are to provide a device of this character comprising a series of connected, parallel strips of suitable material forming a foundation mat or sheet, and a series of separate, detached, analogous strips adapted to be interwoven or combined in alternating order with the connected strips; also to provide the connected strips and the separate strips with correlated pictures or parts thereof, letters or other symbols whereby a child can readily determine the particular intended position or positions of the separate strips with reference to the connected strips or foundation mat and assemble the several strips in the intended order; also to provide a holder or container in which a plurality of such mats or sheets and the complementary separate strips are retained in an orderly arrangement convenient for use; and also to provide an educational appliance or toy having the other novel and improved characteristics hereinafter specified and claimed.

In the drawings:

Fig. 1 is a view of one face of an educational appliance embodying the invention showing some of the separate strips partly withdrawn from the connected strips of the foundation mat or sheet.

Fig. 2 is a similar view of the device completely assembled.

Fig. 3 is a fragmentary view thereof, showing the separate strips, in an alternative arrangement, relatively to the connected strips.

Fig. 4 is a face view of a plurality of the connected strips or foundation mat, arranged in a holder or container, said holder having pockets for the reception of the separate strips.

Figures 5, 6, 7:
Fig. 5 is a face view of one side of a modified embodiment of this invention.
Fig. 6 is a face view of the opposite side thereof.
Fig. 7 is a face view of one of the separate strips of Fig. 6, detached.

In the embodiment of the invention shown in Figs. 1–4, the appliance comprises a foundation sheet or mat 10 composed of a plurality of connected strips or strands 11 extending in parallel relation preferably edge to edge, and a plurality of separate or detached analogous strips or strands 12 adapted to be interwoven or assembled with the strips 10 so as to extend crosswise or at an angle relatively thereto. The mat 10 and the separate strips 12 are made of some suitable thin and flexible material, such as cardboard or book linen.

In producing the mat 10 shown, a sheet of the material of suitable size is cut to provide the parallel strips or strands 11 by forming spaced parallel slits 14 in the sheet, the opposite ends of the strips 11 being left connected by the uncut end portions 15 of said sheet or mat. The separate strips 12 are preferably of the same width as the connected strips 11, and are also preferably, though not necessarily, equal in length to the combined width of the several strips 11, so that when interwoven with the latter, they will terminate at the side edges of the mat.

As shown in Figs. 1–4 of the drawings, the mat strips 11 extend in a vertical direction, and pictures 16 and numbers 17 are displayed thereon in horizontal rows. The pictures alternate with the numbers in each horizontal row, and also alternate with the numbers vertically on the strips 11, so that the pictures and numbers in alternate horizontal rows are in staggered relation. The several pictures 16 in each horizontal row are alike or of similar character, but differ from the pictures in the other horizontal rows 18.

Likewise, each of the detached strips 12 has alternating pictures 16ª and numbers 17ª thereon, the pictures on each strip being the same or of similar character as the pictures 16 in one of the horizontal rows of the mat strips 11.

The reverse faces of the mat strips 11 and of the separate strips 12 also preferably bear pictures and numbers disposed in alternate rows as above described, the pictures being different from those on the front face, and the numbers also being different, or they may be the same numbers, differently arranged, so that, for example, one face of the completed mat can exhibit examples in addition and the other face can exhibit examples in subtraction.

The separate strips 12 are adapted to be interlaced or interwoven with the strips 11, the child being first required to match the pictures on the separate strips with those on the mat strips to determine in which horizontal rows of the mat 10 the strips 12 are to be placed. However, there are four possible ways in which each of the separate strips 12 can be inserted in its intended horizontal position, namely, by starting over the first mat strip 11 with one face of the strip 12 upwards; starting under the first mat strip with the same face of said strip 12 upwards; or starting over said first mat strip with the reverse face of strip 12 upwards; or, finally, by starting the strip 12 under the first mat strip with said reverse face of said strip 12 upwards.

In picture matching and number work, however, two only of these four positions are correct for each strip. The first position is obtained by inserting the separate strip 12 for the top row, for example, in its correct horizontal line with the face thereof uppermost on which appears the pictures corresponding to the pictures in the upper row of the mat, and starting under the first mat strip 11 and over the next, and so on, as shown in Fig. 1. The succeeding strips 12 will start alternately over and under the first mat strip until all are inserted, and if the child has correctly positioned all of the strips, the numbers on the strips 11 and 12 will be correlated to correctly form the arithmetical examples or problems required, as indicated in Fig. 2, which shows the strips in place. When so arranged, the pictures on the mat strips will be hidden by the exposed parts of the separate strips 12, and the pictures on the latter strips 12 will be likewise hidden by the exposed parts of strips 11. Nevertheless, the child has been required to do picture matching in obtaining the required results in number work, and incidently is acquainted with the method of weaving.

If it is desired to teach weaving and also to amuse the child, then the second or alternative correct position for the strips can be used, the child then starting the top strip 12 with the same side uppermost as just described, but inserting the strip over the first mat strip and under the next, and so on, as indicated in Fig. 3. This arrangement will cause all of the pictures on the strips 11 and 12 to be exposed, the pictures on the strips 12 alternating with like or similar pictures on said strips 11 in the respective horizontal rows, while all the numbers on the strips 11 and 12 will be concealed by the exposed parts of the respective strips. The same procedure is required for the other sides of the mat 10 and strips 12. It will be apparent that the device is adapted for teaching color matching as well as picture matching simply by providing color patches on the several strips adapted to be matched in rows in the same manner that the pictures are arranged and matched. Thus the device can be employed simply to match the pictures or colors for amusing the child, or to form the examples in arithmetic or other educational work, depending upon which way the strips are woven, so that the device serves either as a toy, or for educational purposes, both to teach the method of weaving and also for instruction in number and other elementary work.

Preferably a number of the mats 10 constructed as described and each bearing different sets of pictures and numbers are arranged in a suitable holder or container, for instance, they are bound in book form, between covers or leaves 30 of a folder, see Fig. 4, and the leaves 30 are preferably provided on their inner sides with narrow pockets 31 in each of which the separate strips for one of the mats can be retained and from which they can be easily withdrawn to be woven into the mats.

Thus a number of mats and their complementary strips can be conveniently kept in order, and prevented from being scattered about when not in use.

In the slightly modified embodiment of the invention shown in Figs. 5–7, a mat 10ª is disclosed in which the connected strips 11ª and the separate strips 12ª bear complementary parts or sections of a single picture or other matter. In the example in Fig. 5, there is shown a picture formed by weaving the strips 12ª into the strips 11ª, and comprising one face of the mat, while in Fig. 6 is shown the other face of the mat bearing reading matter relating to said picture. Part of this reading matter is disposed on the strips 11ª and the remainder on the strips 12ª (Fig. 7), so that when the strips are properly assembled to complete the picture, the words of the reading matter also will be correctly correlated to complete the story. In this case there is only one correct position for each of the separate strips 12ª in the mat 10ª.

I claim as my invention:—

1. An appliance of the character described, comprising a plurality of parallel strips retained in position edge to edge, and a plurality of separate strips adapted to be interwoven with said other strips to form a mat, said parallel strips and said separate strips having correlated matter thereon adapted to determine a particular position for each of said separate strips in said mat.

2. An appliance of the character described comprising a plurality of parallel strips of flexible material arranged edge to edge and connected at their ends, and a plurality of separate strips adapted to be interwoven with said other strips to form a mat, said connected strips and said separate strips having correlated matter thereon adapted to indicate a particular position for each of said separate strips in said mat.

3. An educational appliance comprising a plurality of parallel strips of flexible material arranged edge to edge and connected at their ends, and a plurality of separate strips adapted to be interwoven with said connected strips in a manner to instruct one in mat weaving, said connected strips and said separate strips having correlated matter thereon adapted, when said strips are assembled in a predetermined relation, to also instruct one in primary educational subjects.

4. An educational appliance comprising a plurality of connected parallel strips arranged edge to edge, and a plurality of separate strips adapted to be interwoven with said other strips to form a mat, said connected strips and said separate strips having matter thereon adapted, when said strips are interwoven in one order to correlate and expose certain parts of said matter and conceal other parts of said matter, and when interwoven in a different order to correlate and expose the previously concealed matter, and conceal the previously exposed matter.

5. An appliance of the character described comprising a plurality of connected parallel strips arranged edge to edge, and a plurality of separate strips adapted to be interwoven with said connected strips and to extend at an angle thereto to form a mat, each of said separate strips being adapted to be assembled in a number of positions in said mat, certain only of said positions being correct, and said separate and connected strips having matter thereon for guiding one in determining a predetermined, correct position for each of said separate strips in said mat.

6. An appliance of the character described comprising a plurality of connected parallel strips arranged edge to edge, and a plurality of separate strips adapted to be interwoven with said other strips and to extend at an angle thereto to form a mat, each of said parallel strips having a plurality of different subjects thereon arranged to form rows of similar subjects when the mat is assembled extending transversely of said strips, and each row having different subjects from those in the other rows, and each of said separate strips having subjects thereon corresponding to the subjects in one of said rows on said parallel strips, whereby said separate strips can be selected and interwoven to correlate the subjects thereon with those on said other strips.

NELLIE YORK TROIDL.